Dec. 21, 1954   O. A. CLEMENS ET AL   2,697,245
CHITTERLING PREPARING MACHINE
Filed Feb. 27, 1953   5 Sheets-Sheet 3
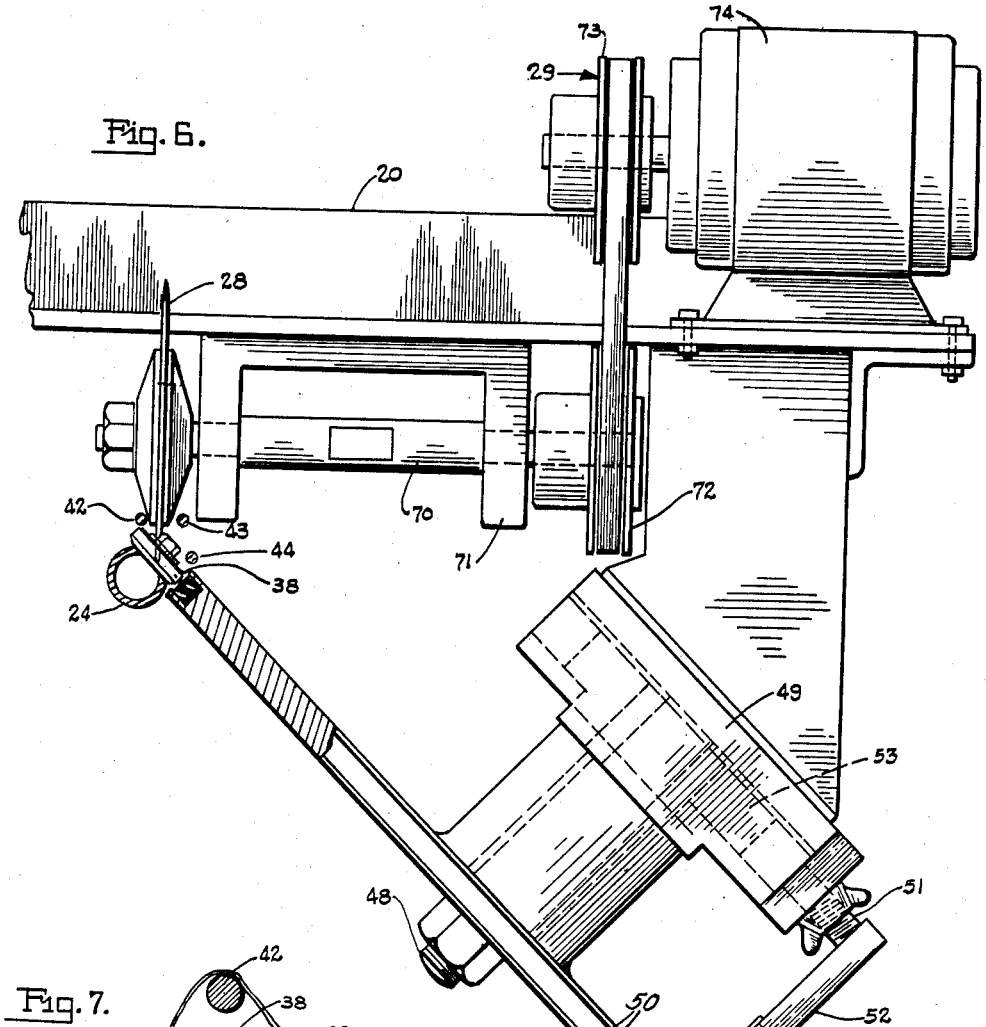
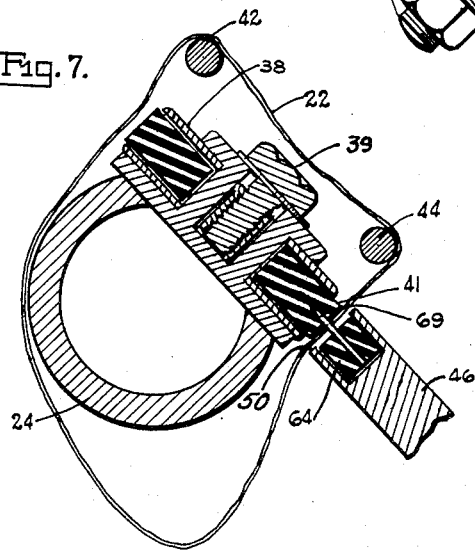
INVENTORS
OGDEN A. CLEMENS
RAYMOND O. MERTENS
MAX WALCKHOF
BY R G Story
ATTORNEY Dec. 21, 1954

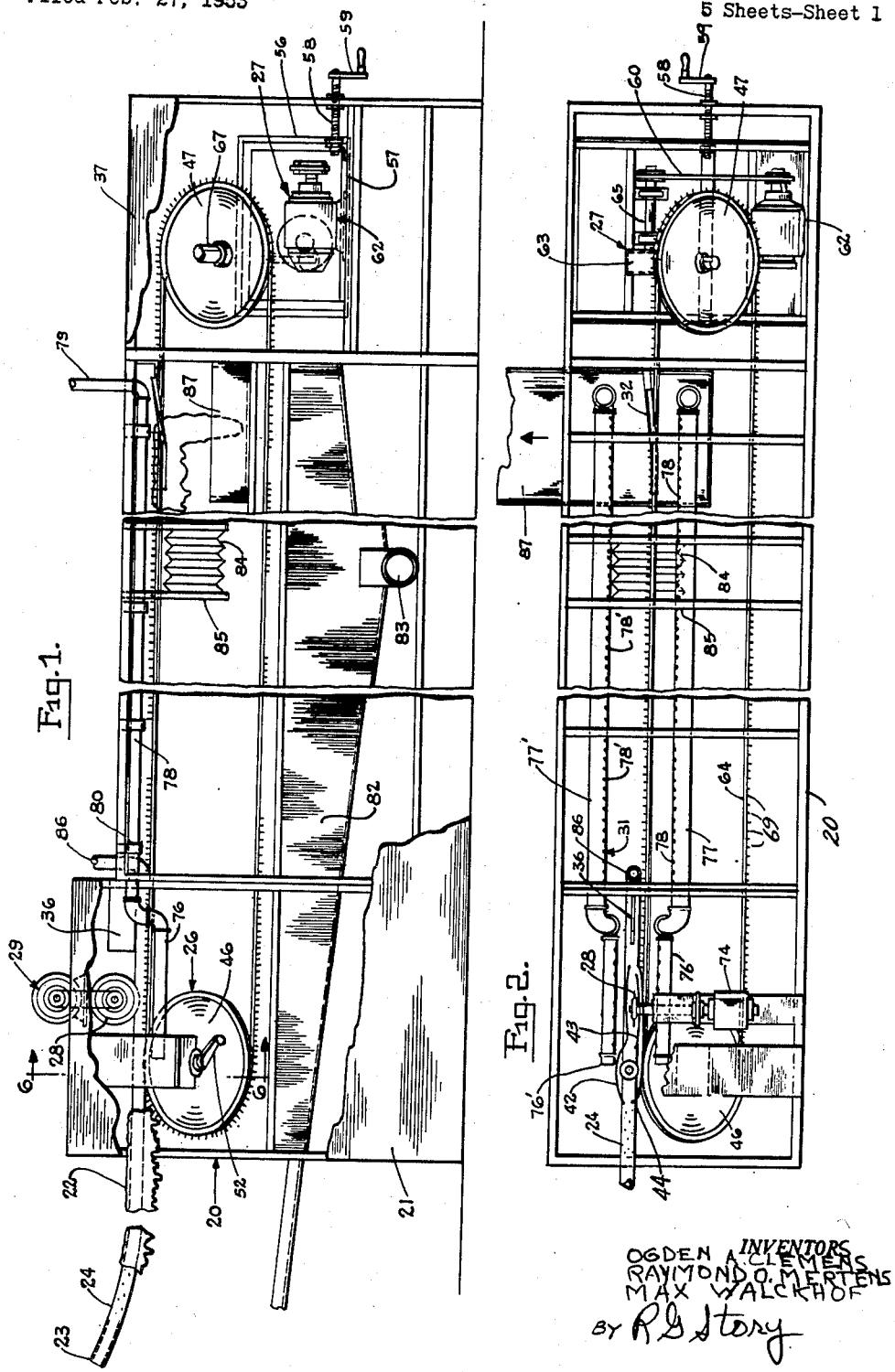

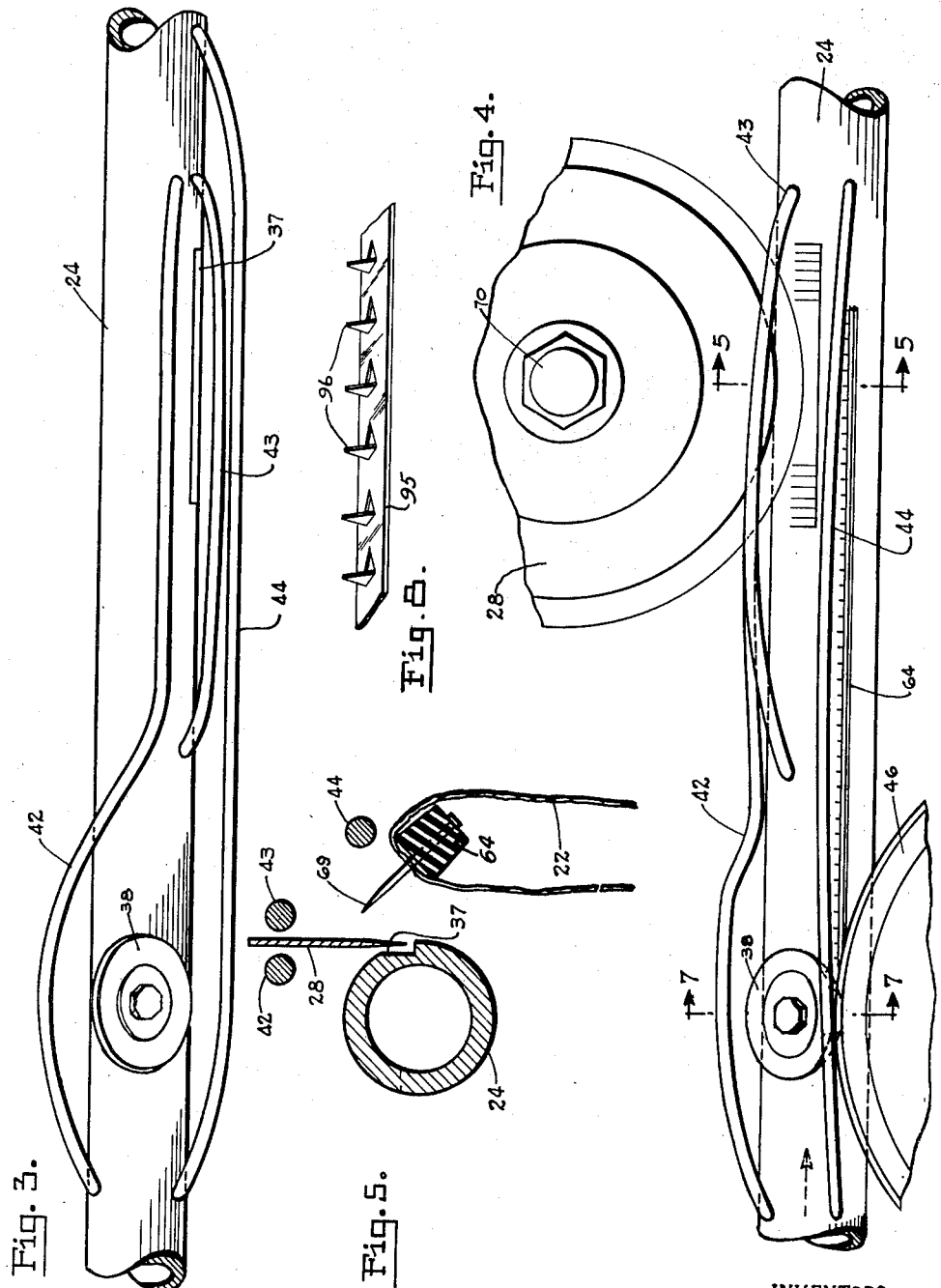

O. A. CLEMENS ET AL 2,697,245

CHITTERLING PREPARING MACHINE

Filed Feb. 27, 1953

OGDEN A. CLEMENS
RAYMOND O. MERTENS
MAX WALCKHOF
INVENTOR.

BY R. L. Story

ATTORNEY

Dec. 21, 1954    O. A. CLEMENS ET AL    2,697,245
CHITTERLING PREPARING MACHINE
Filed Feb. 27, 1953                            5 Sheets-Sheet 5

OGDEN A. CLEMENS
RAYMOND O. MERTENS
MAX WALCKHOF
        INVENTORS

BY *R. G. Story*

ATTORNEY

United States Patent Office 2,697,245
Patented Dec. 21, 1954

2,697,245

CHITTERLING PREPARING MACHINE

Ogden A. Clemens, Chicago, Raymond O. Mertens, Orland Park, and Max Walckhof, Villa Park, Ill., assignors to Swift & Company, Chicago, Ill., a corporation of Illinois Application February 27, 1953, Serial No. 339,408

2 Claims. (Cl. 17—43)

The present invention relates to an apparatus for preparing chitterlings or the like for edible purposes.

The market for chitterlings is generally in excess of the supply despite the fact that the casings, from which the chitterlings may be made, are obtained in large quantities as a "by-product" in the slaughter of animals. The amount of hand labor involved in preparing the chitterlings for the market has made it generally impractical to attempt to process any more than a small fraction of the available product.

The principal object of the present invention is to provide a machine into which a casing may be inserted and which will discharge the casing thoroughly washed and slit longitudinally from one end to the other. With the present invention the same amount of unskilled labor may be used to produce many times the amount of chitterlings which would ordinarily be produced by manual operation alone. The operations required of the manual labor are extremely simple and, as a result, there is no necessity of training skilled machine operators. The only steps required are feeding the casings into one end of the machine, removing the split and washed product from the other end thereof, and inspecting the discharged product.

Additional objects and advantages include: continuous processing, thorough cleaning of casings, simplicity of manufacturing processes involved in producing the machine resulting in a relatively low capital investment, a minimum of moving parts to require care and replacement, and simplicity of operation.

A further object of the invention is to provide a structure for washing or flushing the rotary knife used in opening the casings so as to reduce the possibility of contamination of the casings, improve the cutting action, and to lengthen the blade life.

Further objects and advantages will become apparent from the following description taken in conjunction with the drawings, in which:

Fig. 1 is an elevation of an embodiment of the present invention with the side panels broken away to illustrate the structure thereof;

Fig. 2 is a plan view of the machine illustrated in Fig. 1 with the covers thereof removed;

Fig. 3 is an enlarged plan view of a portion of the mandrel at the splitting station;

Fig. 4 is an elevational view of the portion of the mandrel illustrated in Fig. 3 and also showing the rotary knife and belt feed;

Fig. 5 is a section taken at line 5—5 of Fig. 4;

Fig. 6 is a section taken at line 6—6 of Fig. 1;

Fig. 7 is a section taken at line 7—7 of Fig. 4;

Fig. 8 is an enlarged partial view of an alternative form of a belt;

Figure 9:
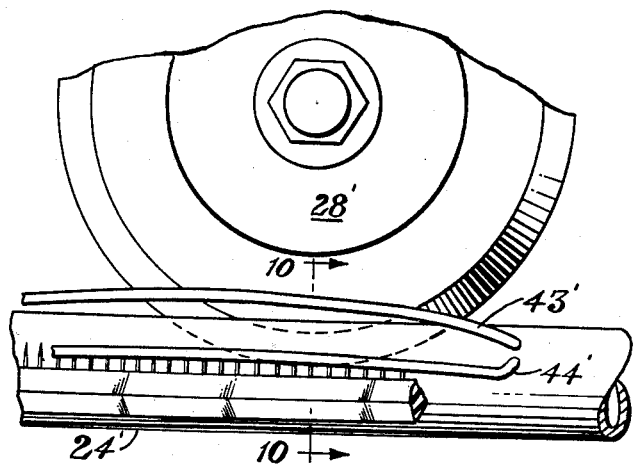
Fig. 9 is an elevation of a fragment of the mandrel and rotary knife illustrating an embodiment wherein the knife rotates through a slot in the mandrel.

Referring to Figs. 1 and 2, a box-like frame 20 covered by enclosure panels 21 supports and carries the various elements that go to make up the present invention. Before specifically describing the various details of the structure, it may be helpful to explain in a very general way the procedure followed in the preparation of the casings with the instant invention.

The casings 22, which are somewhat tubular in form, are slid over the unsupported end 23 of the mandrel 24. The casing moves along the mandrel generally by gravity or by being pushed by hand to a point where it is engaged by a belt feed mechanism, generally 26, driven by a power means, generally 27. The belt feed mechanism draws the casing by a rotary knife 28 driven by a power means, generally 29. The casing is sprayed both before and after splitting by a spraying means, generally 31. After the split casing has moved through a sufficient spray washing area, it contacts a take-off 32 which disengages the casing from the belt in order that it may be removed from the machine.

Mandrel

The mandrel 24 is supported from frame 20 by a vertical bracket 36 attached to frame 20 and secured to the top face of the mandrel 24. At a point between the two ends of the mandrel, the mandrel is cut away as illustrated at 37 in Fig. 5 to receive and prevent contact with the rotary knife 28. In some embodiments the knife may be positioned a greater distance above the mandrel and, in such a case, the cut-away portion 37 may be found to be unnecessary.

At a second point along the mandrel, between unsupported end 23 thereof and the cut-away portion 37, is a rotative pickup wheel 38 suitably journaled about a stud bolt 39 (Fig. 7). The pickup wheel 38 has a soft rubber face 41 to receive the spikes of the belt feed mechanism 26 as hereinafter explained.

Three rods 42, 43, and 44 are attached to the mandrel and serve the function of guides and guards. They hold the casing above the mandrel and prevent the casing from jamming against wheel 38, as illustrated in Fig. 7. Also, they hold the top of the casing sufficiently high that it contacts the front of knife 28 as illustrated in Figs. 4 and 5 to prevent any tendency on the part of the casing to work under the knife rather than being cut by the knife.

Belt feed mechanism

The belt feed mechanism 26 includes a pair of pulleys 46 and 47, pulley 46 being an idler pulley and pulley 47 being driven by power means 27. Pulley 46 is journaled on a spindle 48 mounted in a frame 49 in such a manner that it may be moved back and forth along a line normal to the axis of the spindle 48 and to the axis of the mandrel 24. The peripheries 50 of pulleys 46 and 47 are recessed to receive a belt. Spindle 48 is mounted so that one portion of the recessed periphery 50 of pulley 46 is adjacent the mandrel 24 as illustrated in Figs. 6 and 7. Spindle frame 49 is attached to the machine frame 20 and is threaded to receive an adjusting screw 51 rotatable by means of crank 52. Referring particularly to Fig. 6, a spindle base 53 is mounted in the ways of spindle frame 49 and connected to an adjusting screw 51 so that as crank 52 is rotated pulley 46 is moved towards or away from wheel 38 on mandrel 24.

The power means for driving the belt is mounted in a sub-frame 56 supported on ways 57 forming a part of the main frame 20. A screw and crank, 58 and 59 respectively, permit the sub-frame 56 to be moved back and forth along the ways to adjust the tension of the belt 64 between pulleys 46 and 47.

A motor 62 drives a gear box 63 through a belt 60 and a shaft 65. Projecting upwardly at an angle to the horizontal from the gear box is a shaft 67 upon which is mounted pulley 47. The angle is such that the axis of rotation of pulley 47 is parallel to the axis of rotation of pulley 46. The motor 62, gear box 63, and pulley 47 are all mounted on sub-frame 56.

The belt 64 carries a plurality of projecting spikes formed by needles 69 projecting through the belt as is best shown in Fig. 7. The spikes engage the casing 22 by puncturing the casing as the spikes are received in the soft rubber face 41 of pickup wheel 38. The wheel 38 supports the inner face of the casing 22 so that as the belt travels around pulley 46 towards the mandrel 24, the spikes 69 are driven through the casing to engage the casing, draw it along the mandrel to the knife 28 and to thereafter support the casing for washing.

The belt is positioned at an angle to the horizontal to better retain the casing 22 on spikes 69 and is somewhat below the point of contact between knife 28 and casing 22 in order that the split casing will drap over the belt for most satisfactory washing. The two pulleys 46 and 47 are positioned so that the portion of belt 64 adjacent the mandrel 24 will be substantially parallel to the mandrel.

Knife mechanism

Referring particularly to Fig. 6, the knife 28 is suitably held on a jack shaft 70 journaled in a holder 71 mounted on a frame 20. A pulley 72 on the other end of shaft 71 is belt connected to a pulley 73 on the shaft of motor 74.

Spray means

The spray means includes provision for washing the outside of the casing before the casing is split and for washing the inner portion of the casing after it is split. To this end the spray means 31 includes two substantially identical spray lines, each of which is formed of an initial spray pipe 76 and 76' positioned to wash the casing before it is split and also during the splitting process, and a subsequent spray pipe 77 and 77' positioned so as to wash the casing after it is split. Each of these pipes has a plurality of orifices 78 and 78' along the inner face thereof to direct a spray of water onto the casings. Pipes 76 and 77 are connected together in series and at the end of pipe 77 a feed line 79 conducts wash water to the pipes from a suitable supply source.

The spray pipes are supported from frame 20 by a plurality of brackets 80. The wash water is collected in a drain box 82 and conducted to a discharge point from drain connection 83.

To insure that the pockets of the casing are thoroughly washed a bumper plate 84 is mounted from one of pipes 77 by means of a bracket 85. Bumper plate 84 is positioned at approximately a 45 degree angle to the vertical and below the belt 64. The bumper is preferably corrugated as illustrated in Figs. 1 and 2 although in some embodiments the corrugations may be eliminated. As it will be hereinafter explained, the larger portion of the casing, after splitting, will be hanging to the left of the belt 64 (when viewed in the direction of the line of travel of the belt along the mandrel, as in Figs. 5, 6 and 7) with a smaller portion of the casing hanging over the belt on the right side thereof. For this reason the high side of the bumper is on the right where it will contact the under side of the short piece of casing to the right of the belt and the low side of the bumper is to the left where it will contact the under side of the longer portion of the casing. As the casing rubs across the bumper 84, the corrugations of the bumper push out the pockets in the casing to insure a thorough washing of the casing.

To initially remove a majority of the material within the casing the mandrel 24 is provided with a plurality of fluid openings along the length thereof and water is injected into the supported end of the casing through a feed line 86 leading to a suitable source of supply. The fluid openings may be staggered about the periphery of the mandrel 24. Unsupported end 23 of the mandrel also may be open to permit water to be discharged therethrough.

Take-off

The take-off 32 is positioned astride the belt after the belt has passed through the spray washing area for a sufficient distance to thoroughly wash the casing. The receiving end of the take-off 32 (with respect to the direction of movement of the belt) is below the level of the belt with the rearward end being above the projecting tips of the spikes 69 on the belt.

In addition, the take-off is inclined to the left at substantially the same angle with respect to the horizontal as that of the belt 64 and pulleys 46 and 47. Thus, the upper face of the take-off is substantially nomal to the longitudinal axis of spikes 69 and has a suitable opening therethrough to allow the belt 64 and spikes 69 to pass through the take-off.

A discharge chute 87 below the take-off receives the casings as they are removed from the belt and directs them to a suitable receptacle at the side of the machine.

Knife washing

Figure 10:
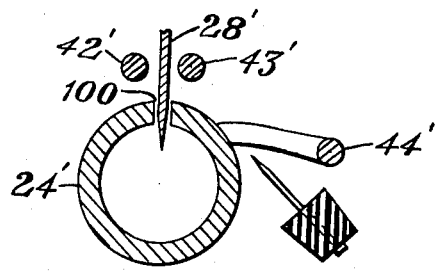
Fig. 10 is a section taken at line 10—10 of Fig. 9.
Figure 11:
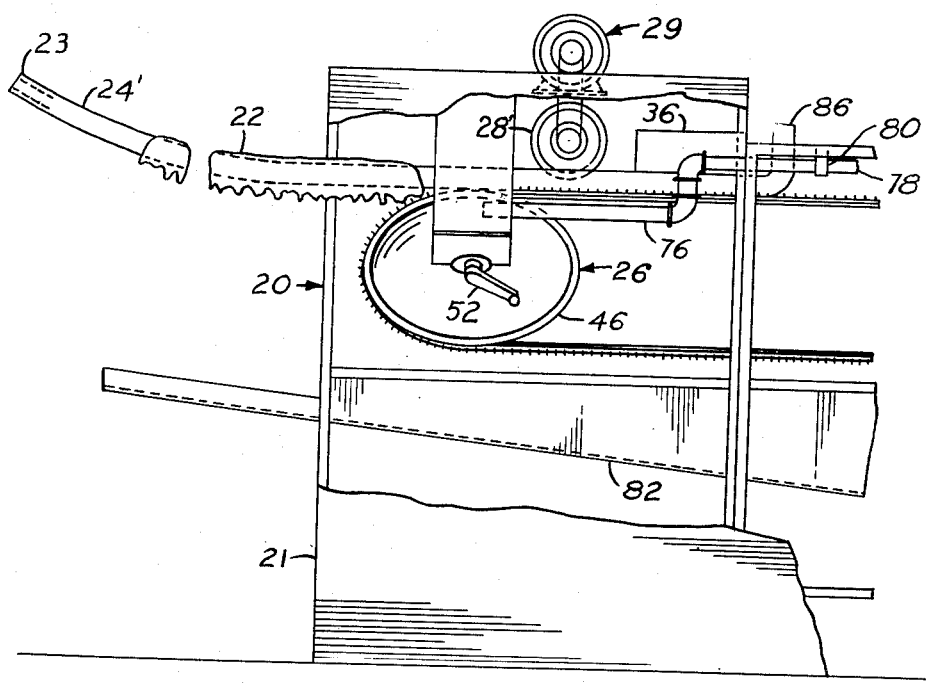
Fig. 11 is a fragmentary elevation illustrating the machine with the rotary knife positioned in a slot in the mandrel.

Figures 9 to 11 illustrate an embodiment wherein the mandrel 24' has a slot 100 therein extending between the surface and the hollow interior of the mandrel. As is seen in Figure 9 the slot 100 is elongated in a direction parallel to the longitudinal axis of the mandrel 24'. The rotary knife 28' projects through slot 100. The rods 42', 43', and 44' are positioned to draw the casing out tight as it passes the knife as previously described.

Some of the water flowing through the mandrel from feed line 86 previously described and illustrated in Figures 1 and 2, gushes out through slot 100 to flush the edge of the blade 28'. This washing out is further facilitated by the rotation of the knife in the bath of water running through the interior of the mandrel 24'.

Operation

The operator slides the casings over the unsupported end 23 of the mandrel 24 which is inclined sufficiently so that the weight of the casings will normally carry them along the mandrel until engaged by the belt. As the needles contact the casing, it is further dragged along the mandrel until it is opposite the pick-up wheel at which point the wheel offers sufficient support to the inner face of the casing to allow the spikes 69 to puncture the casing, as illustrated in Fig. 7.

Engaged by the belt the casing is further moved along the mandrel and is held up above the knife by guides 42 and 43. As the casing is split it falls down from around the mandrel with the majority of the casing being to the left of the belt because of the position of the knife with respect to the mandrel and belt. Rod 44 holds the right hand side of the casing sufficiently above the belt that when the right hand side of the casing falls away from the knife, it falls over the right side of the belt.

In this position the casing 22 is firmly supported on the belt and is in such a position that the inner portion thereof is laid open for thorough washing. The fact that the belt is below the point at which the casing contacts the knife allows this procedure to be carried out by the natural operation of gravity.

The casing on the belt then proceeds through the second spray washing area that is bounded by pipes 77 and 77'. In this area it contacts bumper 84 to clean any pockets that may exist in the casing. Further progress of the casing brings it into contact with take-off 32 upon which the casing gradually rides upwardly and toward the left so that the spikes 69 are withdrawn from the casing. The weight of the casing as it is lifted from the belt carries it downwardly to the left where it falls upon discharge chute 87 for removal from the machine.

The foregoing description is for the purpose of compliance with 35 United States Code, Section 112, and should not be construed as imposing any unnecessary limitations upon the appended claims. Such obvious modifications as using a stainless steel belt 95 having projecting points 96 punched out therefrom as shown in Figure 8 in place of rubber belt 64 with needles 69 may be made without departing from the spirit of the invention.

We claim:

1. In a device of the class described, a frame, a hollow mandrel attached to said frame and adapted to receive casings thereabout, said mandrel having a slot therein extending between the surface and the hollow interior, a knife rotatably mounted on said frame, said knife being positioned with a portion thereof projecting into said slot, and power means connected to said knife to rotate said knife, said mandrel having a fluid connection communication with the hollow interior whereby a fluid may be injected into said mandrel to flush the knife in said slot.

2. In a device of the class described, a frame, an elongated, hollow, mandrel attached to said frame adjacent one end of said mandrel with the other end thereof being unsupported, said mandrel having a slot therein between said two ends of the mandrel, said slot extending between the surface of the mandrel and the hollow interior thereof and being elongated in a direction parallel to the elongated dimension of said mandrel, a generally circular knife rotatably mounted on said frame and positioned with a portion of the periphery thereof extending through said slot, said mandrel having a fluid connection adjacent said one end thereof and communicating with the hollow interior whereby a fluid may be injected into said mandrel to flush the periphery of said knife, and power means connected to said knife to rotate said knife.

References Cited in the file of this patent

UNITED STATES PATENTS

| Number | Name | Date |
|---|---|---|
| 1,479,104 | Lytle | Jan. 1, 1924 |
| 2,340,755 | Jacobson | Feb. 1, 1944 |
| 2,641,020 | Clemens et al. | June 9, 1953 |